United States Patent [19]
Cahill, III

[11] Patent Number: 5,838,382
[45] Date of Patent: Nov. 17, 1998

[54] METHOD AND APPARATUS FOR OPTIMIZING STARTING POINT FOR RUN-IN CLOCK RECOVERY

[75] Inventor: Benjamin M. Cahill, III, Ringoes, N.J.

[73] Assignee: Intel Corporation, Santa Clara, Calif.

[21] Appl. No.: 670,565

[22] Filed: Jun. 26, 1996

[51] Int. Cl.⁶ ................................................. H04N 7/087
[52] U.S. Cl. ..................... 348/465; 348/464; 348/547; 348/478; 348/477
[58] Field of Search ................................... 348/547, 545, 348/476, 478, 505, 508, 510, 512, 513, 529, 536, 548, 464, 465, 477, 479, 473; H04N 7/087

[56] References Cited

U.S. PATENT DOCUMENTS

| 4,502,077 | 2/1985 | Morotomi et al. | 348/614 |
|---|---|---|---|
| 4,600,943 | 7/1986 | Tanabe | 348/468 |
| 4,658,294 | 4/1987 | Park | 348/464 |
| 4,667,235 | 5/1987 | Nozoe et al. | 348/464 |
| 4,774,715 | 9/1988 | Messenger | 375/2.8 |
| 5,089,892 | 2/1992 | Koguchi et al. | 348/614 |
| 5,293,234 | 3/1994 | Ko | 348/614 |
| 5,311,311 | 5/1994 | Harigai et al. | 348/476 |
| 5,311,312 | 5/1994 | Oh | 348/614 |
| 5,371,545 | 12/1994 | Tults | 348/465 |
| 5,483,289 | 1/1996 | Urade et al. | 348/468 |
| 5,486,865 | 1/1996 | James | 348/465 |
| 5,491,518 | 2/1996 | Kim | 348/607 |
| 5,506,626 | 4/1996 | Yagi et al. | 348/464 |
| 5,512,954 | 4/1996 | Shintani | 348/468 |
| 5,517,249 | 5/1996 | Rodriguez-Cavazos et al. | 348/465 |
| 5,521,645 | 5/1996 | Ezaki | 348/465 |
| 5,537,151 | 7/1996 | Orr et al. | 348/564 |
| 5,552,726 | 9/1996 | Wichman et al. | 348/149 |
| 5,555,024 | 9/1996 | Limberg | 348/473 |
| 5,555,025 | 9/1996 | McArthur | 348/478 |
| 5,559,560 | 9/1996 | Lee | 348/465 |
| 5,561,469 | 10/1996 | Schultz | 348/465 |
| 5,565,930 | 10/1996 | Bolger et al. | 348/572 |
| 5,589,886 | 12/1996 | Ezaki | 348/461 |
| 5,590,154 | 12/1996 | Forni et al. | 375/229 |
| 5,654,765 | 8/1997 | Kim | 348/614 |
| 5,657,088 | 8/1997 | Hankinson | 348/465 |

FOREIGN PATENT DOCUMENTS

| 0 516 216 A2 | 12/1992 | European Pat. Off. . |
|---|---|---|
| 0 552 577 A1 | 7/1993 | European Pat. Off. . |
| 0 614 551 A1 | 9/1994 | European Pat. Off. . |
| 4-227378 (A) | 8/1992 | Japan . |
| 08317254 (A) | 11/1996 | Japan . |
| WO 94/27400 | 11/1994 | WIPO . |

OTHER PUBLICATIONS

PCT International Search Report for International Application No. PCT/US97/10350 (Docket No. 42390.P3735), dated Jan. 27, 1998, 1 page.
PCT International Search Report for International Application No. PCT/US97/09759, dated Sep. 4, 1997, 1 page.
Joint EIA/CVCC Recommended Practice for Teletext: North American Basic Teletext Specification (NABTS), EIA Standard: EIA–516, May 1988, pp.: Cover, Preface, i–vi, 1–5, and 62–65.
"Recommended Practice for Line 21 Data Service", EIA Standard: EIA–608, Sep. 1994, pp.: Cover, i–iv, and 7–9.
PCT International Search Report for International Application No. PCT/US97/10360 (Docket No. 42390.P3734), dated Oct. 9, 1997, 1 page.
PCT International Search Report for International Application No. PCT/US97/10362 (Docket No. 42390.P3733), dated Oct. 17, 1997, 1 page.

Primary Examiner—John K. Peng
Assistant Examiner—Jean W. Désir
Attorney, Agent, or Firm—Blakely, Sokoloff, Taylor & Zafman

[57] ABSTRACT

A hardware system is programmed with a vertical blanking interval (VBI) scan line run-in clock recovery function, preferably noise tolerant that optimizes the starting point for recovering the leading run-in clock of a VBI scan line by maintaining at least one average starting position for VBI scan lines, and using the at least one average starting position to establish the starting point. The at least one average starting position is updated continuously with the actual locations where first rising edges in the run-in clocks of various scan lines are found.

16 Claims, 5 Drawing Sheets

METHOD AND APPARATUS FOR OPTIMIZING STARTING POINT FOR RUN-IN CLOCK RECOVERY

BACKGROUND OF THE INVENTION

1. Field of the Invention

The present invention relates to the field of television signal processing. More specifically, the present invention relates to the determination of a starting point for recovery of the leading run-in clock of a vertical blanking interval (VBI) scan line.

2. Background Information

Broadcasting of closed captions, teletext, etc. in the vertical blank intervals of television signals is known in the art. VBI scan lines are typically broadcast during the vertical blank intervals in accordance with one of a number of industry standard formats. For example, teletext scan lines are often broadcast in accordance with North American Broadcast Television Specification (NABTS)[1]. Since hardware systems processing VBI scan lines typically operate with their own internal system clocks, virtually all industry standard formats call for the inclusion of a leading run-in clock at the beginning of a VBI scan line, to facilitate synchronization and decoding of the VBI scan line. For example, NABTS calls for a modulated data bit rate of 5.7272 Mhz, and the inclusion of 8 run-in clock cycles at the beginning of a teletext scan line, followed by phase-aligned modulated data bits to be decoded.

[1] See Joint EIA/CVCC Recommended practice for Teletext North American Basic Teletext Specification (NABTS), EIA-516, May, 1998.

Conventional capture hardware would begin sampling the VBI scan line some lead time before the beginning of the run-in clock, using an oversampling ratio typically in the range of 3.0 to 6.0 times the data rate frequency, and continue capturing until the end of the VBI scan line. A conventional decoder would begin processing the VBI scan line at the beginning of the captured data, that is, some significant number of samples before the beginning of the run-in clock. From the oversampled run-in clock data, a conventional decoder would determine the average phase error of each clock peak, relative to a reference point, and adjust the reading of the data to be decoded accordingly, so that the readings are evaluated at the actual centers of the modulated data bit. If the average phase error, or any individual phase error, exceeds certain predetermined ranges, the VBI scan line will be rejected.

This conventional approach of starting processing a significant number of samples before the run-in clock, and using the average phase error of all run-in clock cycles as a basis for determining the proper phase adjustment, has a number of disadvantages:

a) substantial processing cycles can be wasted in processing the "pedestal" at the beginning of a VBI scan line before the first rising edge;

b) the average phase error is distorted if the pedestal area contains noise which could be improperly interpreted as part of the run-in clock;

c) the average phase error is exaggerated if one or more cycles of the run-in clocks were distorted by the presence of noise; and d) as a result, many otherwise good teletext scan lines wound up being unnecessarily rejected, simply because of the presence of a "large noise" in one or two of the run-in clock cycles, or before the beginning of the run-in clock cycles."

Thus, it is desirable if a more efficient as well as more tolerant or more precise run-in clock recovery approach can be found. As will be described in more details below, the present invention provides the improved approach, and achieves the above described desire as well as other desirable results, which will be readily apparent to those skilled in the art from the descriptions to follow.

SUMMARY OF THE INVENTION

A hardware system is programmed with a VBI scan line run-in clock recovery function that optimizes the starting point for recovering the leading run-in clock of a VBI scan line by maintaining at least one average starting position for VBI scan lines, and using the at least one average starting position to establish the starting point. The at least one average starting position is updated continuously with the actual locations where first rising edges in the run-in clocks of various scan lines are found.

In one embodiment, a first safety threshold is applied to each computed starting point to ensure the starting point is before the first rising edge of a run-in clock. In one embodiment, a second safety threshold is also applied to each update to an average starting point to ensure the average point has not drifted into the run-in clock. In one embodiment, different average starting points are maintained for different groups of VBI scan lines. In one embodiment, average starting points are maintained on a scan line by scan line basis.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
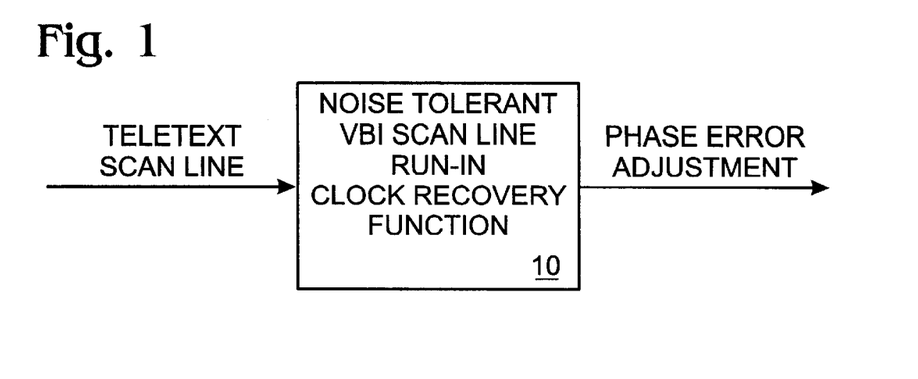
FIG. 1 is a block diagram illustrating an overview of the present invention.

Referring now to FIG. 1, a block diagram illustrating an overview of the present invention is shown. As shown, in accordance with a first aspect of the present invention, noise tolerant VBI scan line run-in clock recovery function 10 (hereinafter simply recovery function) recovers a leading run-in clock included at the beginning of a VBI scan line in a more accurate manner, tolerating the presence of noise in one or more of the clock cycles of the leading run-in clock. More specifically, for the illustrated embodiment, recovery function 10 determines the phase adjustment for reading sampling data, using only phase error observations that fall within a heavily populated phase error super-subrange, and excluding the remaining phase error observations from the determination, to be described more fully below. As will be appreciated by those skilled in the art, from the description to follow, recovery function 10 provides a more accurate approach to recovery of the leading run-in clock, and reduces unnecessary rejections of VBI scan lines.

In accordance with a second aspect of the present invention, recovery function 10 further includes an optimization technique for optimizing the starting point for analyzing the run-in clock, thereby reducing CPU cycle consumption on unproductive analysis, as well as reducing susceptibility to noise before the start of the run-in clock.

Figure 2:
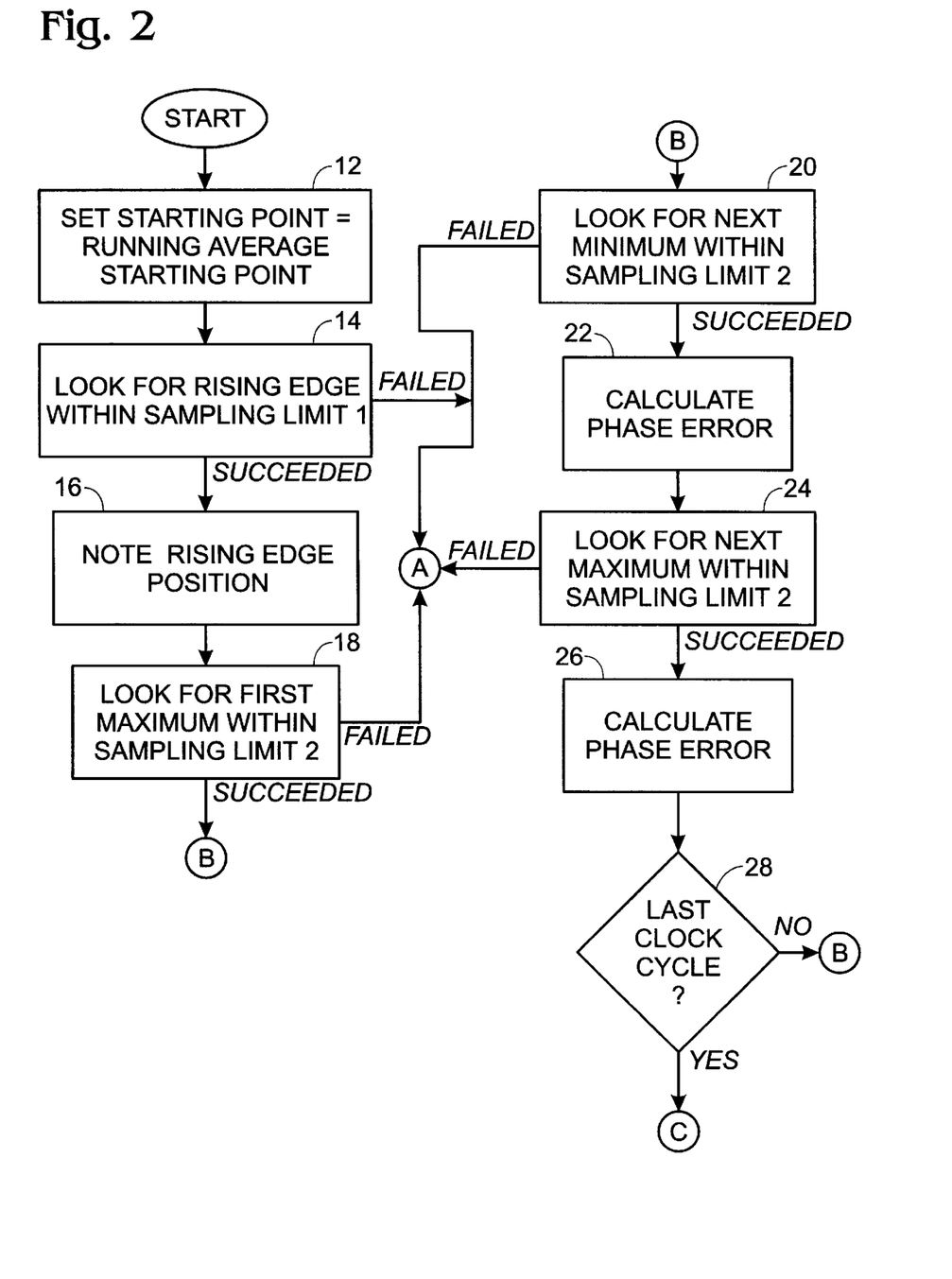
FIGS. 2–4 are flow diagrams illustrating one embodiment of the operational steps of the noise tolerant run-in clock recovery function of the present invention.
Figure 3:
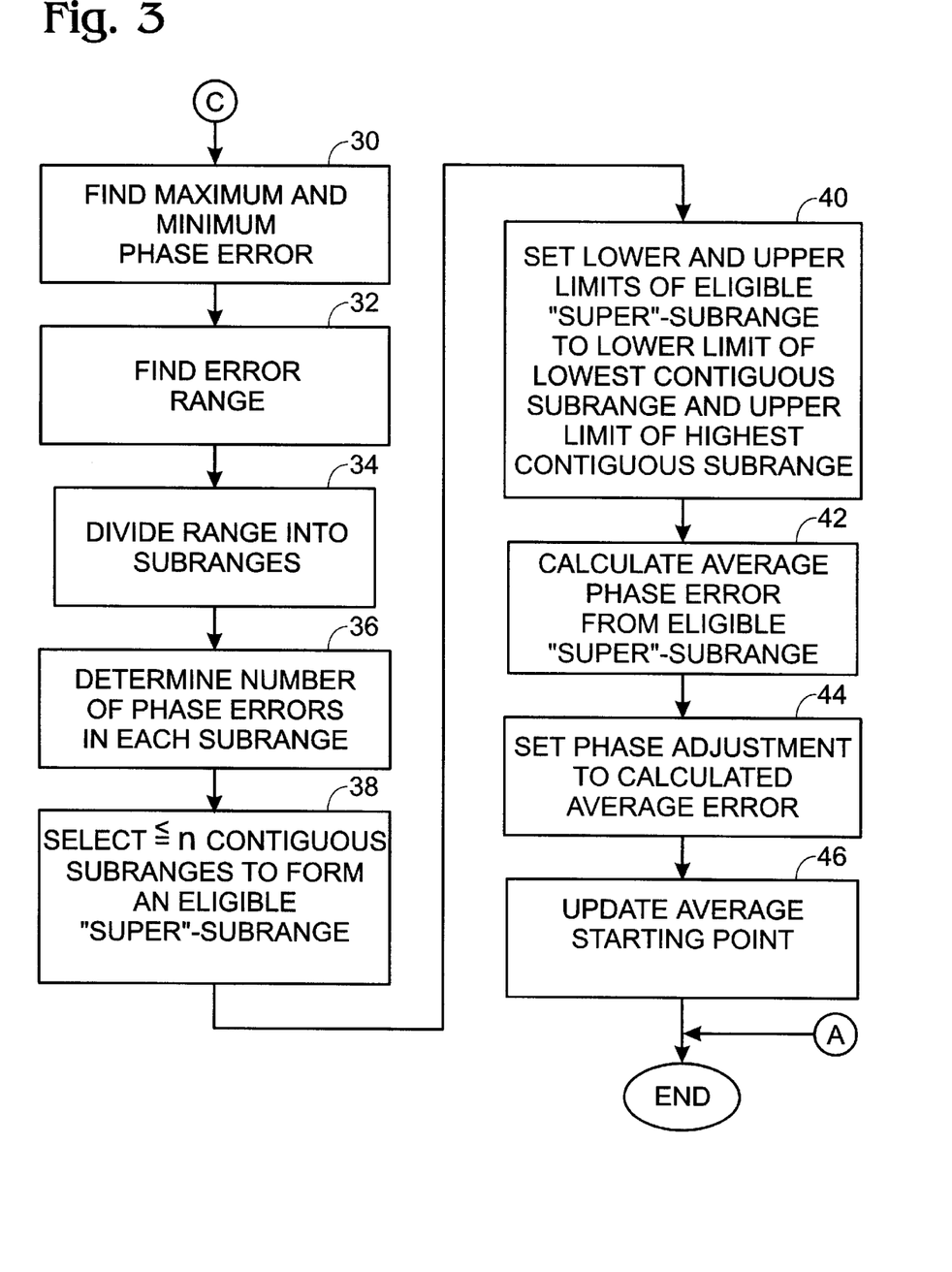
Figure 4:
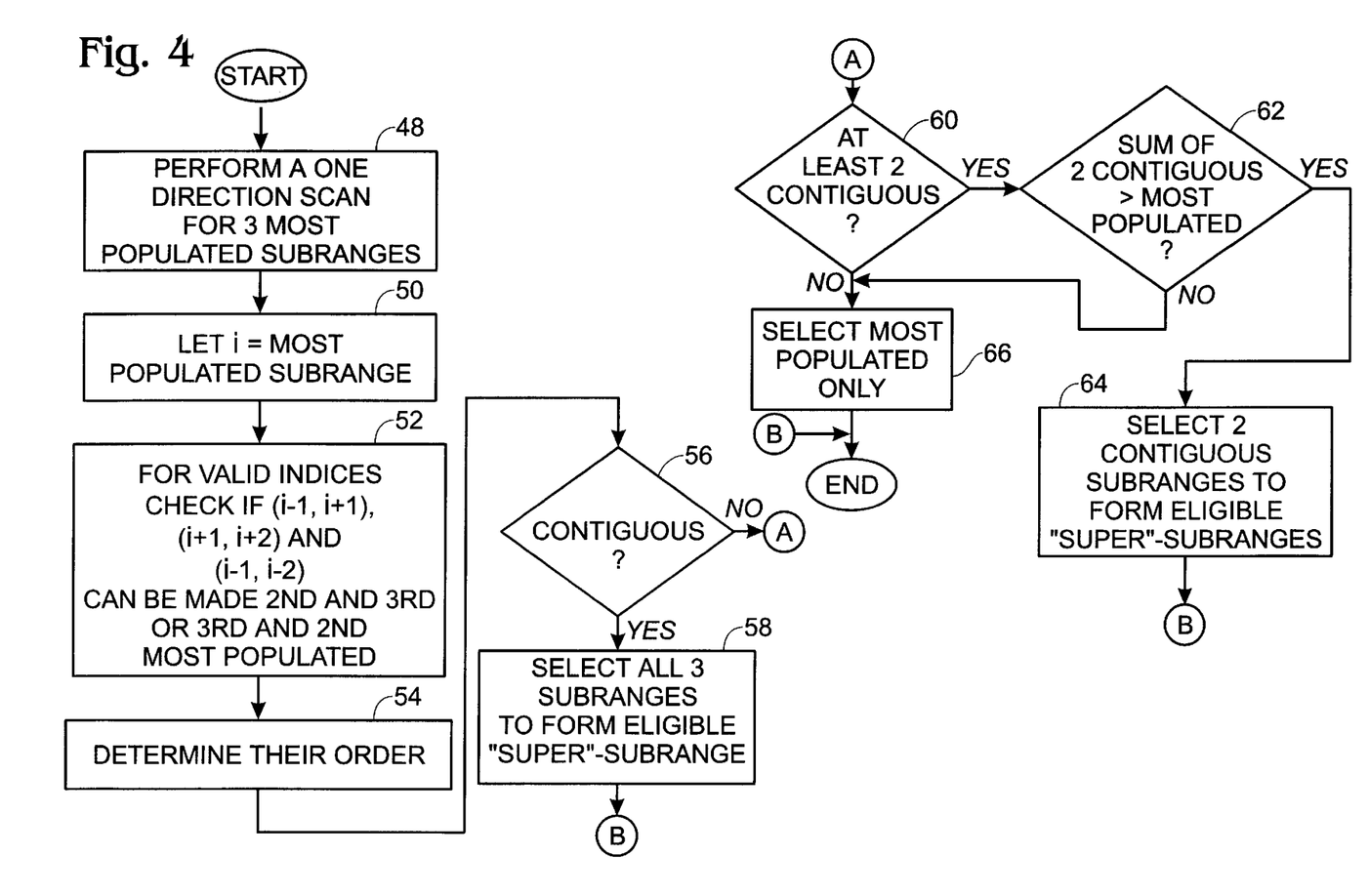

Referring now to FIGS. 2–4, wherein one embodiment of the operational flow of recovery function 10 is illustrated. As shown in FIG. 2, for the illustrated embodiment, upon invocation, recovery function 10 sets the starting point for analyzing the run-in clock to an average starting position maintained by recovery function 10, step 12. For the illustrated embodiment, the average starting point is set to the beginning of captured data for a scan line at initialization or reset.

In one embodiment, recovery function 10 further applies a safety threshold to the starting position to account for timing jitter from scan line to scan line or field to field, e.g. by subtracting a predetermined quantity from the current average starting position of the run-in clock. In one embodiment, separate average starting points are maintained for different scan lines, e.g. on a scan line by scan line basis, or on a scan line group by scan line group basis, to more accurately optimize the start points when different lines have different modulation sources or different types of modulation.

Continuing to refer to FIG. 2, having established the starting point, recovery function 10 looks for the first rising edge, step 14. If the first rising edge is found within a first sampling limit, recovery function 10 continues with step 16, otherwise, recovery function 10 rejects the scan line. At step 16, recovery function 10 notes the position where the first rising edge was detected for the current scan line. In one embodiment, designed to support NABTS compliant teletext scan lines at an oversampling ratio of 5 to 1, the first sampling limit equals 128.

Having located the first rising edge, recovery function 10 looks for the first maximum, step 18. Similarly, if the first maximum is found within a second sample limit, recovery function 10 continues with step 20, otherwise, recovery function 10 rejects the scan line. In the above described NABTS supporting embodiment, the second sampling limit equals 7.

Once the first maximum is located, recovery function 10 looks for the maximum and minimum for all successive clock cycles, steps 20–28. Similarly, for each maximum/minimum search, step 20 or 24, if the maximum/minimum is found within the second sample limit, recovery function 10 continues, otherwise, recovery function 10 rejects the scan line. Starting with the first minimum, each time a minimum is found, recovery function determines the phase error, step 22. Likewise, starting with the second maximum, each time a maximum is found, recovery function determines the phase error, step 26. Recovery function 10 continues this process, until the last clock cycle has been located, step 28. In the above described NABTS supporting embodiment, the last clock cycle is the 8th clock cycle.

Phase error may be computed in any one of a number of known techniques. For example, phase error may be computed in accordance with the sample position and an estimated arctangent value (phase error=phase error+sample position+estimated arctangent value). The estimated arctangent value represents the amount of "tilting" of a line connecting the pre-max/min value and the post-max/min value. The estimated arctangent value is computed from a fraction formed by the difference between a post-max/min value and a pre-max/min value, and the sum of the differences between the max/min value and the pre-max/min value, and the max/min value and the post-max/min value (fraction=(post max/min value−pre-max/min value)/((max/min value−pre-max/min value)+(max/min value−post max/min value))).

As shown in FIG. 3, having computed the phase errors from all maximums and minimums found, recovery function 10 determines the maximum and minimum phase errors, step 30. Based on the maximum and minimum phase errors, recovery function 10 computes a phase error range, step 32. Then, recovery function 10 divides the phase error range into subranges, step 34, determines the number of phase errors in each subrange, step 36. For the illustrated embodiment, recovery function 10 divides the phase error range into 8 subranges.

Having found the population in each subrange, recovery function 10 selects N or less contiguous subranges to form an eligible phase error super-subrange, step 38. For the above described NABTS supporting embodiment, N equals 3. Having constructed the eligible phase error super-subrange, recovery function 10 sets the lower and upper phase error limits of the super-subrange to the lower limit of the lowest contiguous subrange and the upper limit of the contiguous subrange respectively, step 40.

Next, recovery function 10 calculates the average phase error, using only phase errors that fall within the eligible phase error super-subrange, and excluding all other phase errors, step 42, thereby excluding distortions in a few clock cycles due to the presence of noise, improving accuracy, and avoiding unnecessary rejections of scan lines. Recovery function 10 then sets phase adjustment to the calculated average phase error, step 44.

Finally, for the illustrated embodiment, recovery function 10 updates the average starting point for analyzing the run-in clock, including the most recent position where the first rising edge of the run-in clock is found. In one embodiment, recovery function 10 further applies another safety threshold to the updated average starting point to prevent the average starting position to drift to far into the run-in clock, e.g. by limiting the start position to be no greater than a predetermined number of samples from the beginning of the captured scan line.

In one embodiment, recovery function 10 further periodically scans the pedestal data between the beginning of the captured scan line and the current average start position. If a rising edge is found in this region, the current average start position is set back to the position of that rising edge. A typical period for performing such scanning is 15 to 60 scan lines.

FIG. 4 illustrates one embodiment of step 38 in further detail. As shown, for the illustrated embodiment, recovery function 10 first performs a one direction scan for 3 most populated subranges, step 48. Then, recovery function 10 determines if the subranges adjacent to the most populated subrange can be substituted as the second and/or third most populated subranges, steps 50–52. The reason this "swapping" may be necessary is because subranges adjacent to the most populated subrange may not have been considered as the second or third most populated subrange, because their population was merely equal but not greater than a subrange earlier considered to be the second or third subrange. For example, if the one direction scan was from subrange 0 to subrange 7, subrange 1 has three phase error observations falling within its subrange, and subrange 5 is considered to be the most populated subrange by virtue of having four phase error observations falling within its subrange, subrange 6 would not be considered as the second most populated subrange during the one direction scan, even if it also has three phase error observations falling within its subrange, because the population count merely equals but not greater than the population count of subrange 1. In other words, in steps 50–52, if i is the subrange index of the most populated subrange, recovery function 10 examines if {i−1, i+1}, {i+1, i+2} and {i−1, i−2} can be considered as second and third or third and second most populated subranges (for all valid indices[2]).

[2] Obviously, for i=0, i−1 and i−2 are invalid; likewise for i=7, i+1 and i+2 are invalid.

Having determined the three most populated subranges, recovery function 10 determines their order, i.e. first, second, and third, or, first, third and second, and so forth, most populated, step 54. Then, recovery function 10 determines if the three subranges are contiguous, step 56. If they are already contiguous, recovery function 10 selects all three subranges to form the eligible super-subrange, step 58. On the other hand, if the three subranges are not contiguous, recovery function 10 determines if at least two of the subranges are contiguous, i.e. low and mid subranges or mid and high subranges, step 60. If at least two of the subranges are contiguous, recovery function 10 further determines if the sum of the populations of the two contiguous subranges is greater than the single non-contiguous subrange, step 62. If the sum is greater, recovery function 10 selects the two contiguous subranges to form the eligible super-subrange, step 64. Otherwise, recovery function 10 selects the most populated subrange as the eligible super subrange, step 66.

In one embodiment, the above described recovery function 10 is invoked to recover the run-in clock, after a VBI scan line has been rejected using a conventional clock recovery approach. As will be appreciated by those skilled in the art, the recovery function 10 while more accurate will require more processing cycles, thus a hybrid approach may provide the desired improvement in accuracy without incurring significant increase to processing cycle requirement, particularly when noise occurs only intermittently.

Figure 5:
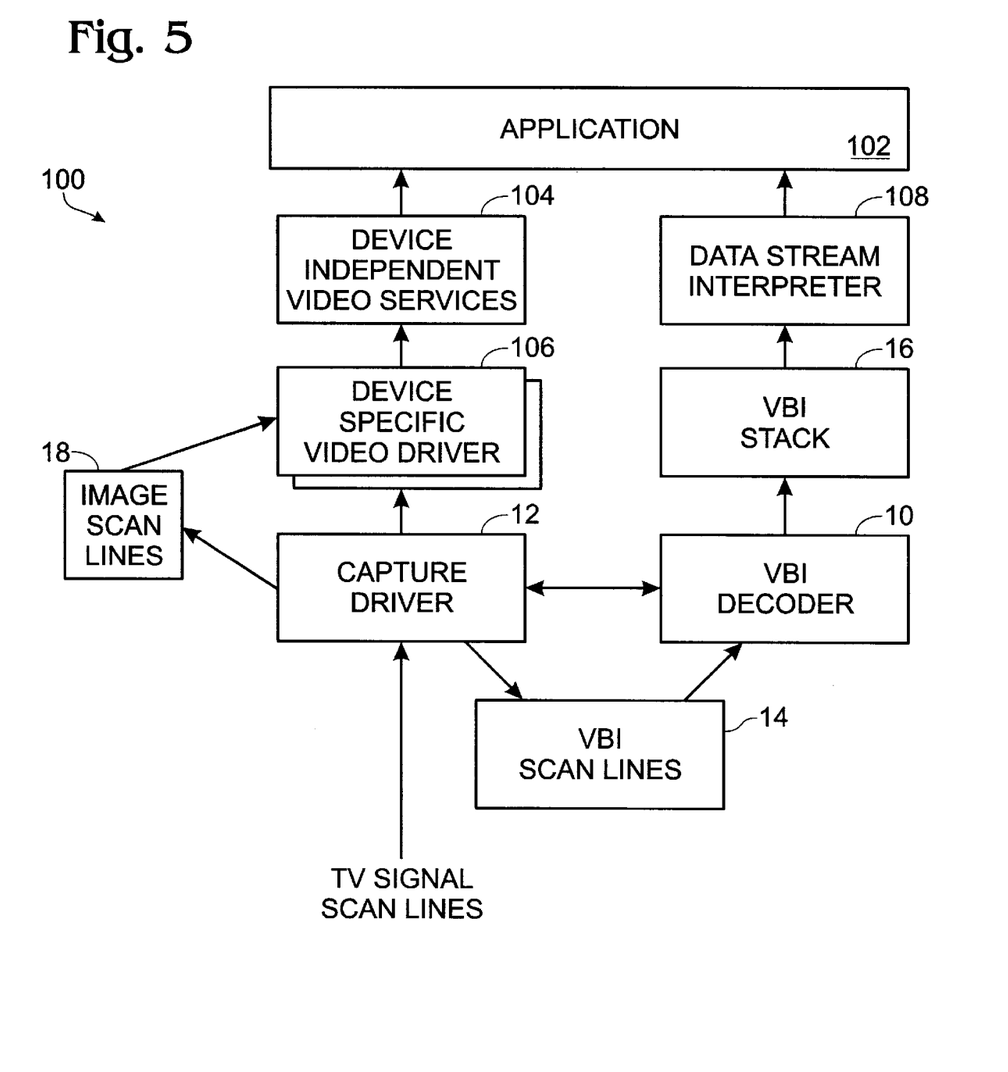
FIG. 5 is a block diagram illustrating one embodiment of a software environment suitable for practicing the present invention.

Referring now to FIG. 5, wherein a block diagram illustrating one embodiment of a software environment suitable for practicing the present invention is shown. As shown, software embodiment 100 includes common VBI scan line decoder 10 (hereinafter simply common decoder), capture driver 12, cooperating with each other to generate image scan lines 18, and VBI scan lines 14. VBI scan lines 14 are decoded by decoder 10 into VBI stack 16. Decoded scan lines are in turn interpreted by data stream interpreter 108. Common decoder 10 and capture driver 12 are disclosed in copending U.S. patent application Ser. No. 08/670,568, filed Jun. 26, 1996, entitled, Method And Apparatus For Common Vertical Blanking Interval Scan Line Decoding, invented by the inventor of the present invention, and filed contemporaneously with the present application.

Additionally, image scan lines 18 are processed by device dependent video drivers 106, e.g. VfW drivers that implement Microsoft Direct™ video support, which in turn provides the processed data to a device independent video service 104, e.g. Microsoft Video for Windows. The device independent video service 104 then generates the television images for application 102. With respect to the decoded teletext (including closed captions), video stream interpreter 108 interprets the decoded teletext for application 102.

Figure 6:
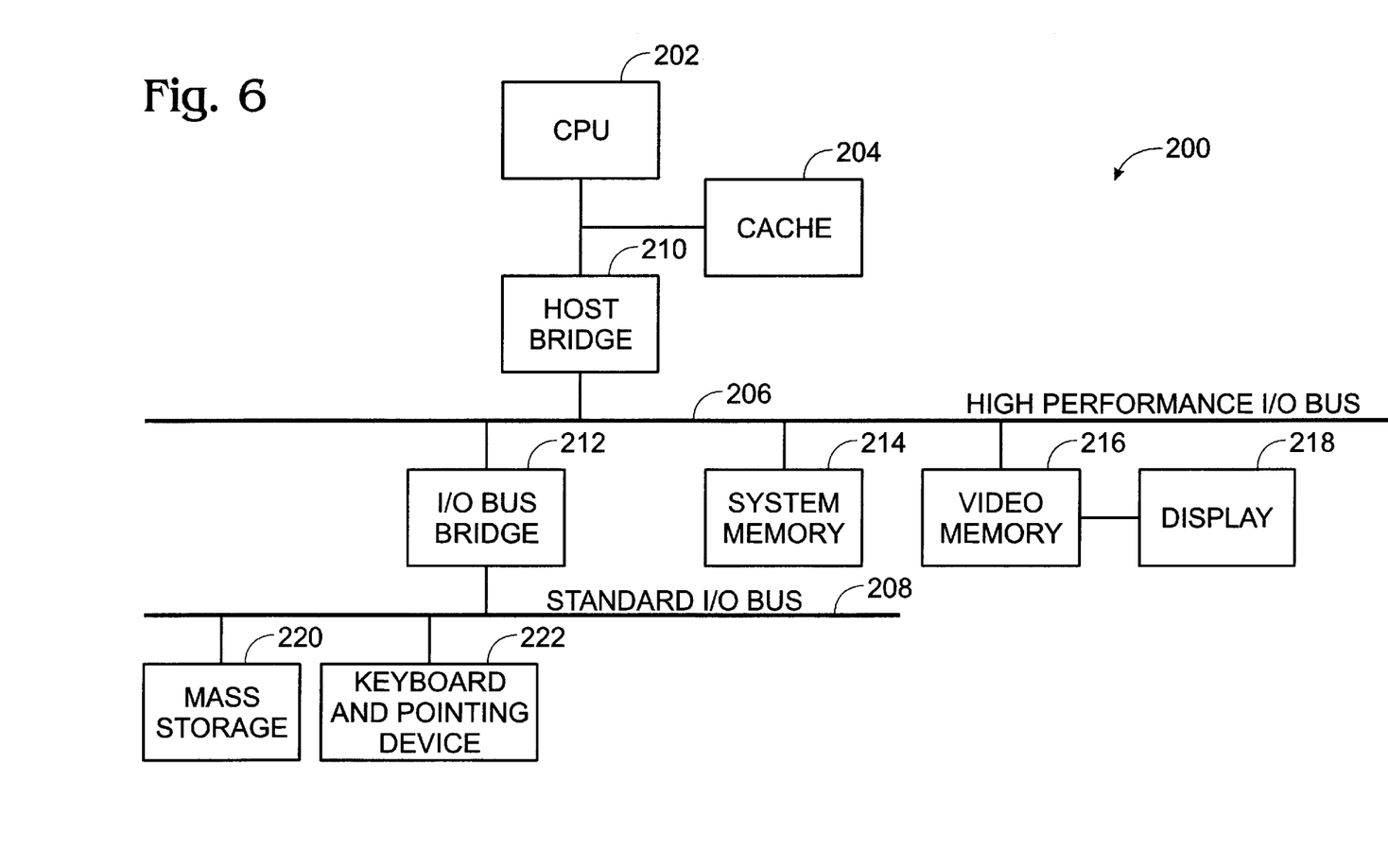
FIG. 6 is a block diagram illustrating one embodiment of a hardware system suitable for programming with the software environment of FIG. 5.

FIG. 6 illustrates one embodiment of a hardware system suitable for programming with the software elements of FIG. 5. As shown, for the illustrated embodiment, hardware system 200 includes CPU 202 and cache memory 204 coupled to each other as illustrated. Additionally, hardware system 200 includes high performance I/O bus 206 and standard I/O bus 208. Host bridge 210 couples CPU 202 to high performance I/O bus 206, whereas I/O bus bridge 212 couples the two buses 206–208 to each other. Coupled to bus 206 are system memory 214 and video memory 216. In turn, display device 218 is coupled to video memory 216. Coupled to bus 208 is mass storage 220 and keyboard and pointing device 222.

These elements 202–222 perform their conventional functions known in the art. In particular, mass storage 220 is used to provide permanent storage for the programming instructions implementing the above described functions, whereas system memory 214 is used to provide temporary storage for the programming instructions when executed by CPU 202. Mass storage 220 may be provided with the programming instructions by loading the programming instructions from a distribution storage medium (not shown), or by downloading the programming distributions from a server (not shown) coupled to hardware system 200 via a network/communication interface (not shown). Collectively, these elements are intended to represent a broad category of hardware systems, including but not limited to general purpose computer systems based on the Pentium™ processor, manufactured by Intel Corp. of Santa Clara, Calif., assignee of the present invention.

Thus, a method and apparatus for noise tolerant run-in clock recovery has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An apparatus comprising:

an execution unit for executing programming instructions;

a storage medium coupled to the execution unit having stored therein a plurality of programming instructions to be executed by the execution unit, the programming instructions implementing a recovery function for recovery of a synchronization clock at the beginning of a vertical blanking interval (VBI) scan line, the recovery function determining a starting point for performing the recovery based on at least one maintained average starting point.

2. The apparatus as set forth in claim 1, wherein the recovery function further derives and maintains the at least one average starting point.

3. The apparatus as set forth in claim 2, wherein the recovery function derives and maintains the at least one average starting point based on actual positions of first rising edges of synchronization clocks of predecessor VBI scan lines.

4. The apparatus as set forth in claim 2, wherein the recovery function derives and maintains different average starting points for different groups of VBI scan lines.

5. The apparatus as set forth in claim 2, wherein the recovery function derives and maintains different average starting points on a scan line by scan line basis.

6. The apparatus as set forth in claim 2, wherein the recovery function applies a safety threshold to each newly derived average starting point to prevent the derived average starting point from drifting too far into a synchronization clock.

7. The apparatus as set forth in claim 2, wherein the recovery function initializes each maintained average starting point to the beginning of a VBI scan line at initialization time.

8. The apparatus as set forth in claim 1, wherein the recovery function applies a safety threshold to the determined starting point to ensure recovery is started before a first rising edge of the synchronization clock.

9. A machine implemented method for determining a starting point for recovering a synchronization clock at the beginning of a vertical blanking interval (VBI) scan line, the method comprising the steps of:

a) maintaining at least one average starting point; and b) establishing the starting point for recovering the synchronization clock for the VBI scan line based on the maintained at least one average starting point.

10. The machine implemented method as set forth in claim 9, wherein both steps (a) and (b) are performed by a recovery function for recovering synchronization clocks for VBI scan lines.

11. The machine implemented method as set forth in claim 10, wherein step (a) comprises deriving and maintaining the at least one average starting point based on actual positions of first rising edges of synchronization clocks of predecessor VBI scan lines.

12. The machine implemented method as set forth in claim 10, wherein step (a) comprises deriving and maintaining different average starting points for different groups of VBI scan lines.

13. The machine implemented method as set forth in claim 10, wherein step (a) comprises deriving and maintaining different average starting points on a scan line by scan line basis.

14. The machine implemented method as set forth in claim 10, wherein step (a) comprises applying a safety threshold to each newly derived average starting point to prevent the derived average starting point from drifting too far into a synchronization clock.

15. The machine implemented method as set forth in claim 10, wherein step (a) comprises initializing each maintained average starting point to the beginning of a VBI scan line at initialization time.

16. The machine implemented method as set forth in claim 9, wherein step (b) comprises applying a safety threshold to the determined starting point to ensure recovery is started before a first rising edge of the synchronization clock.

* * * * *

UNITED STATES PATENT AND TRADEMARK OFFICE
CERTIFICATE OF CORRECTION

PATENT NO. : 5,838,382 Page 1 of 1
DATED : November 17, 1998
INVENTOR(S) : Cahill, III

It is certified that error appears in the above-identified patent and that said Letters Patent is hereby corrected as shown below:

Column 1,
Line 32, delete "1998", insert -- 1988 --.

Column 6,
Line 21, delete "Direct$^{TM}$", insert -- DirectX$^{TM}$ --.

Signed and Sealed this

Twenty-fifth Day of November, 2003

JAMES E. ROGAN
*Director of the United States Patent and Trademark Office*